US012662086B2

(12) United States Patent
Kim et al.

(10) Patent No.: US 12,662,086 B2
(45) Date of Patent: Jun. 23, 2026

(54) WIPING APPARATUS FOR CAMERA AND CONTROL METHOD THEREFOR

(71) Applicant: SL Mirrortech, Siheung-si (KR)

(72) Inventors: Yonghwan Kim, Siheung-si (KR);
Yonghei Kim, Siheung-si (KR); Mingi Jung, Siheung-si (KR); Yeongkook Cho, Siheung-si (KR)

(73) Assignee: SL Mirrortech, Siheung-Si (KR)

( * ) Notice: Subject to any disclaimer, the term of this patent is extended or adjusted under 35 U.S.C. 154(b) by 17 days.

(21) Appl. No.: 18/735,019

(22) Filed: Jun. 5, 2024

(65) Prior Publication Data

US 2025/0001975 A1 Jan. 2, 2025

(30) Foreign Application Priority Data

Jun. 30, 2023 (KR) ........................ 10-2023-0084842
Jul. 26, 2023 (KR) ........................ 10-2023-0097152

(51) Int. Cl.
| | |
|---|---|
| *B60S 1/26* | (2006.01) |
| *B60Q 9/00* | (2006.01) |
| *B60S 1/08* | (2006.01) |
| *B60S 1/52* | (2006.01) |

(52) U.S. Cl.
CPC .................. *B60S 1/26* (2013.01); *B60Q 9/00* (2013.01); *B60S 1/08* (2013.01); *B60S 1/522* (2013.01)

(58) Field of Classification Search
None
See application file for complete search history.

(56) References Cited

FOREIGN PATENT DOCUMENTS

KR 20190058069 A * 5/2019 ................ B60S 1/56

OTHER PUBLICATIONS

Google Patents translation of KR20190058069A (Year: 2025).*

* cited by examiner

*Primary Examiner* — Eric W Golightly
(74) *Attorney, Agent, or Firm* — United One Law Group LLC; Kongsik Kim; Jhongwoo Peck

(57) ABSTRACT

A wiping apparatus for a camera includes a housing in which a driving part is configured to be mounted; a rotation part that rotates by being engaged with a worm gear, which is coupled to a first rotation axis of the driving part; a conversion part that converts a rotational motion into a linear reciprocating motion within the housing by being engaged with the rotation part; and a cleaning part that extends from the conversion part to an outside of the housing. The cleaning part wipes a surface of a protective cover, which is provided in front of a lens of a camera module.

9 Claims, 13 Drawing Sheets

Figure 13:
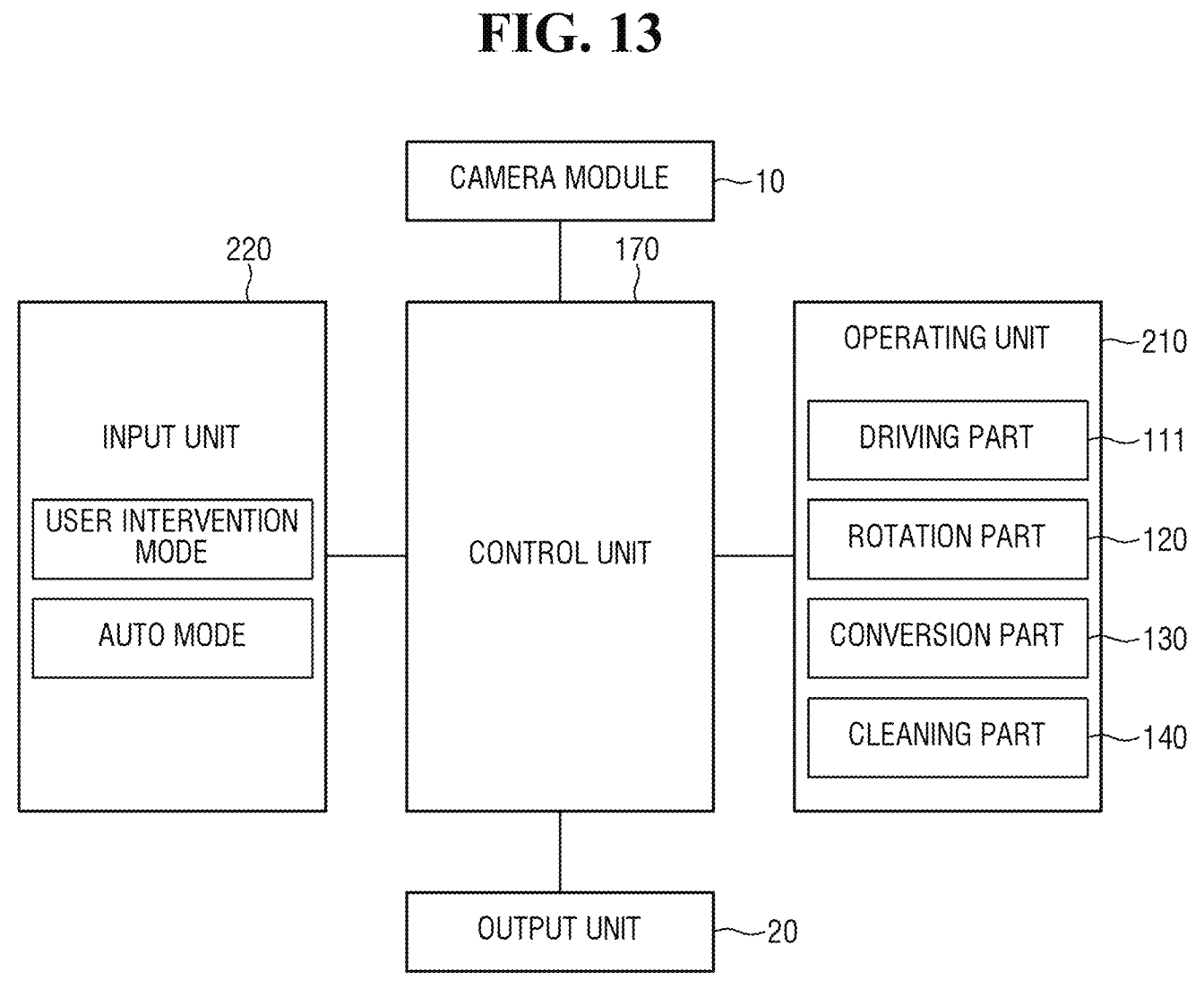

CAMERA MODULE — 10

170

OPERATING UNIT — 210

DRIVING PART — 111

ROTATION PART — 120

CONVERSION PART — 130

CLEANING PART — 140

CONTROL UNIT

OUTPUT UNIT — 20

INPUT UNIT — 220

USER INTERVENTION MODE

AUTO MODE

WIPING APPARATUS FOR CAMERA AND CONTROL METHOD THEREFOR

CROSS-REFERENCE TO RELATED APPLICATION

This application claims priority from Korean Patent Application No. 10-2023-0097152 filed on Jul. 26, 2023 and Korean Patent Application No. 10-2023-0084842 filed on Jun. 30, 2023. The aforementioned applications are incorporated herein by reference in their entireties.

BACKGROUND

1. Technical Field

The present disclosure relates to a wiping apparatus for a camera and a control method therefor, and more particularly, to a wiping apparatus for a camera that is designed to remove or clean off foreign substances adhered to the surface of a protective cover located in front of a vehicle's camera lens, and a control method for the wiping apparatus.

2. Description of the Related Art

Recently, cameras serving various purposes have been installed in the front, rear, and side sections of vehicles. These cameras minimize blind spots by displaying the surroundings of the vehicles through the drivers' displays or mirrors, thereby facilitating safer driving.

Front cameras and rear cameras installed in vehicles are primarily used for black boxes (e.g., dashcams) to analyze the causes of accidents, while side cameras provide images of blind spots during driving or parking and are used to check surround views in conjunction with the front cameras and/or rear cameras.

Such vehicle cameras are prone to have foreign substances like rain, snow, or dust attached to the surface of their covers, causing difficulties for the drivers to view the surroundings of the vehicles.

To solve this and other problems, techniques such as equipping wipers have been applied. However, issues arise as the wipers are exposed to the external environment, getting contaminated themselves, or cleaning may only be effective in limited areas even when the wipers are in operation.

Furthermore, conventional camera wipers, which are simply operated by being turned on and off, face issues such as getting stuck due to foreign substances or failing to operate in situations at freezing temperatures in winter, leading to potential damage to the wipers. Therefore, improvements are needed.

SUMMARY

The present disclosure provides a wiping apparatus for a camera and its control method that can wipe the entire area of the surface of a protective cover located in front of a camera module's lens, minimize contamination of wipers as a blade is not exposed to the exterior, and enable control to prevent damages to the wiping apparatus.

According to an aspect of the present disclosure, a wiping apparatus for a camera may include a housing in which a driving part is configured to be mounted; a rotation part that rotates by being engaged with a worm gear, which is coupled to a first rotation axis of the driving part; a conversion part that converts a rotational motion into a linear reciprocating motion within the housing by being engaged with the rotation part; and a cleaning part that extends from the conversion part to an outside of the housing. The cleaning part may wipe a surface of a protective cover, which is provided in front of a lens of a camera module.

The rotation part may include a worm wheel, which rotates about a second rotation axis, which is not parallel to the first rotation axis of the worm gear, and a screw shaft, which includes the worm wheel disposed at a proximal end portion thereof and includes a first gear formed on an outer circumferential surface thereof where the worm wheel is not disposed.

The conversion part may include a transfer member, which includes a second gear formed on an inner circumferential surface thereof to engage with the first gear, and an extension member, which extends from the transfer member to be at least partially exposed on the outside of the housing.

The cleaning part may include an arm member, which has a proximal end bent at a distal end of the extension member to correspond to the protective cover and has a length corresponding to a height or width of the protective cover, a blade, which is detachably mounted in the arm member by being inserted from a front of the arm member and protrudes at least partially to a rear of the arm member facing the surface of the protective cover, and a rotary cover, which is rotatably coupled to the arm member to cover the front of the arm member.

The arm member may include a mounting hole, which is formed to allow the blade to be inserted thereinto, and steps, which are configured to be interfered with the blade in a direction of coupling of the blade to prevent the blade from passing through the mounting hole.

The blade may include an elastic piece, which is configured to elastically contact the surface of the protective cover when inserted into the mounting hole, and a mounting piece, which is integrally formed with the elastic piece and is installed inside the mounting hole by abutting the steps.

The arm member may include protrusion pieces, which protrude from either side of a proximal end of the arm member and selectively interfere with first coupling holes formed on either side of a proximal end of the rotary cover, and support pieces, which protrude from either side of a distal end of the arm member and form a rotation axis by being inserted into second coupling holes formed on either side of a distal end of the rotary cover.

The extension member may have an aperture formed on one side thereof adjacent to the transfer member, and the conversion part may include a guide member, which is disposed parallel to the screw shaft inside the housing and guides the linear reciprocating motion of the extension member.

The wiping apparatus may further include: a cover coupled on the housing to cover the rotation part, a transfer part of the conversion part, and the driving part; and a washer fluid injection module coupled to the outside of the housing, which is configured to spray cleaning fluid toward the surface of the protective cover.

According to another aspect of the present disclosure, a wiping apparatus for a camera may include a rotation part configured to be rotated by a driving part and a conversion part connected to the rotation part to be linearly movable, and a control method for the wiping apparatus may include a wiping mode entry step automatically or manually placing the wiping apparatus in a wiping mode; and a wiping apparatus operation step including a normalcy determination step that determines the wiping apparatus as operating normally and an initial position setting step, the initial setting position step including an event situation determination step that determines the wiping as being abnormal, wherein the normalcy determination step includes a skip step that skips current measurement within a first time range set during an initial operation of the driving part, and the event situation determination step sets a driving current for the wiping apparatus.

In the normalcy determination step, as power is supplied to the driving part such that the conversion part moves in a first direction, the skip step may be performed, and the normalcy determination step may further include, after the skip step, a cutoff step that cuts off the power to the driving part within both a predetermined second time range and a predetermined current range in response to detecting that the movement of the conversion part in the first direction is limited.

The normalcy determination step may determine a position where the movement of the conversion part in the first direction is limited and the conversion part is only movable in a second direction, which is opposite to the first direction, as a base position.

The event situation determination step may include a current cutoff step that cuts off the power in response to detecting that an overvoltage above a predetermined driving voltage is applied, an intermittent supply step that supplies the power intermittently over a predetermined third time range, and a continuous supply step that supplies the power continuously over a fourth time range, which is longer than the third time range.

The current cutoff step may gradually reduce supplied current and then may cut off the current.

The control method may further include a wiping result output step displaying results derived from the initial position setting step, and the wiping result output step may include an alarm provision step that displays a normal operating state of the conversion part and a warning message transmission/power cutoff step that displays an abnormal operating state of the conversion part.

The wiping apparatus operation step may control a magnitude of a voltage applied to the driving part during the cutoff step such that a rate of reduction in the voltage gradually decreases over time.

According to another aspect of the present disclosure, a wiping apparatus for a camera may include a camera module that monitors surroundings of a vehicle; an operating unit including a rotation part configured to be rotated by a driving part, a conversion part connected to the rotation part to be linearly movable, and a cleaning part connected to the conversion part to clean the camera module; an input unit that selects an operating mode for the driving part; and a control unit configured to determine whether an operation of the driving part is normal or abnormal and to control power to the driving part. The control unit may be configured to current measurement within a predetermined first time range set during an initial operation of the driving part in response to determining that the operation of the driving part is normal, and may be configured to set a driving current for the driving part in response to determining that the operation of the driving part is abnormal.

The control unit may be configured to cut off the power to the driving part within both a predetermined second time range and a predetermined current range in response to detecting that a movement of the conversion part in a first direction is limited.

In response to determining that the operation of the driving part is abnormal, the control unit may be configured to cut off the power, supply the power intermittently over a predetermined third time range, or supply the power continuously over a fourth time range, which is longer than the third time range, in response to detecting that an overvoltage above a predetermined driving voltage is applied.

The wiping apparatus may further include an output unit that displays results showing whether the operation of the driving part is normal or abnormal.

According to the aforementioned and other embodiments of the present disclosure, first, through initial position setting, the entire surface of the protective cover located in front of the lens of the camera module can be controlled to be wiped.

Second, in the event situation determination step, the timing and interval of current application and cutoff can be adjusted, allowing the conversion part and the cleaning part to be sequentially restored to an operable state even in cases of inoperability due to foreign substances or freezing conditions.

Third, by controlling the rate of reduction in the magnitude of the voltage applied to the driving part to gradually decrease over time, back noise generated due to the characteristics of a motor can be entirely or substantially eliminated.

Fourth, in cases of malfunction of the cleaning part and the conversion part, a fail-safe feature for the driving part can be ensured.

Fifth, through the wiping result output step, the user can more easily identify whether the wiping apparatus is in a normal operating state or an abnormal operating state.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which:

FIG. 13 is a block diagram illustrating a wiping apparatus for a camera according to another embodiment of the present disclosure.

DETAILED DESCRIPTION

The present disclosure can have various modifications made thereto, and can have numerous embodiments. Thus, embodiments of the present disclosure will hereinafter be described with reference to the accompanying drawings. However, this should not be construed as limiting the disclosure to any specific embodiment, and it is to be understood as encompassing all modifications, equivalents, and alternatives falling within the spirit and scope of the disclosure.

Terms including ordinal numbers such as "first," "second," etc., can be used to describe various components, but these components are not limited by these terms. These terms are used only to distinguish one component from another. For example, without departing from the scope of the disclosure, a second component may be termed as a first component, and similarly, a first component may also be termed as a second component.

The term "and/or" includes any and all combinations of one or more of the associated listed items.

When a component is said to be "connected" or "coupled" to another component, it can be directly connected or coupled to the other component, or intervening components may be present. In contrast, when a component is said to be "directly connected" or "directly coupled" to another component, it should be understood that no intervening components are present.

The terms used in this application are for the purpose of describing particular embodiments only and are not intended to limit the disclosure.

Unless the context clearly requires otherwise, singular expressions should be understood to include the plural.

In this application, the terms "comprising" or "having," etc., denote the presence of stated features, numbers, steps, operations, components, parts, or combinations thereof, and are not intended to preclude the presence or addition of one or more other features, numbers, steps, operations, components, parts, or combinations thereof.

The embodiments will hereinafter be described in detail with reference to the attached drawings. However, the same or corresponding components are assigned the same reference numbers regardless of the figure numbers, and redundant descriptions thereof will be omitted.

Figure 1:
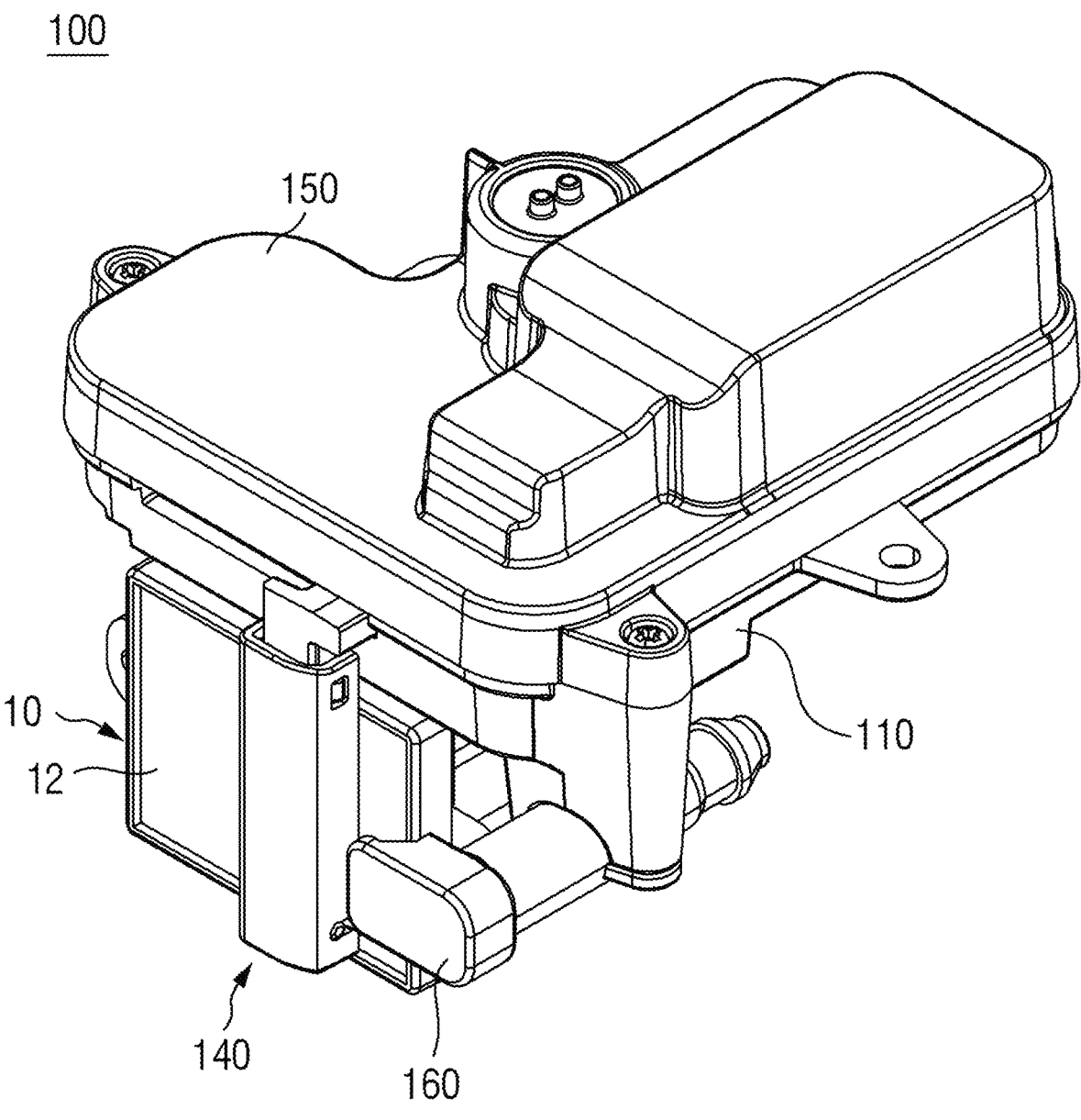
FIG. 1 is a perspective view illustrating a wiping apparatus for a camera according to an embodiment of the present disclosure.
Figure 2:
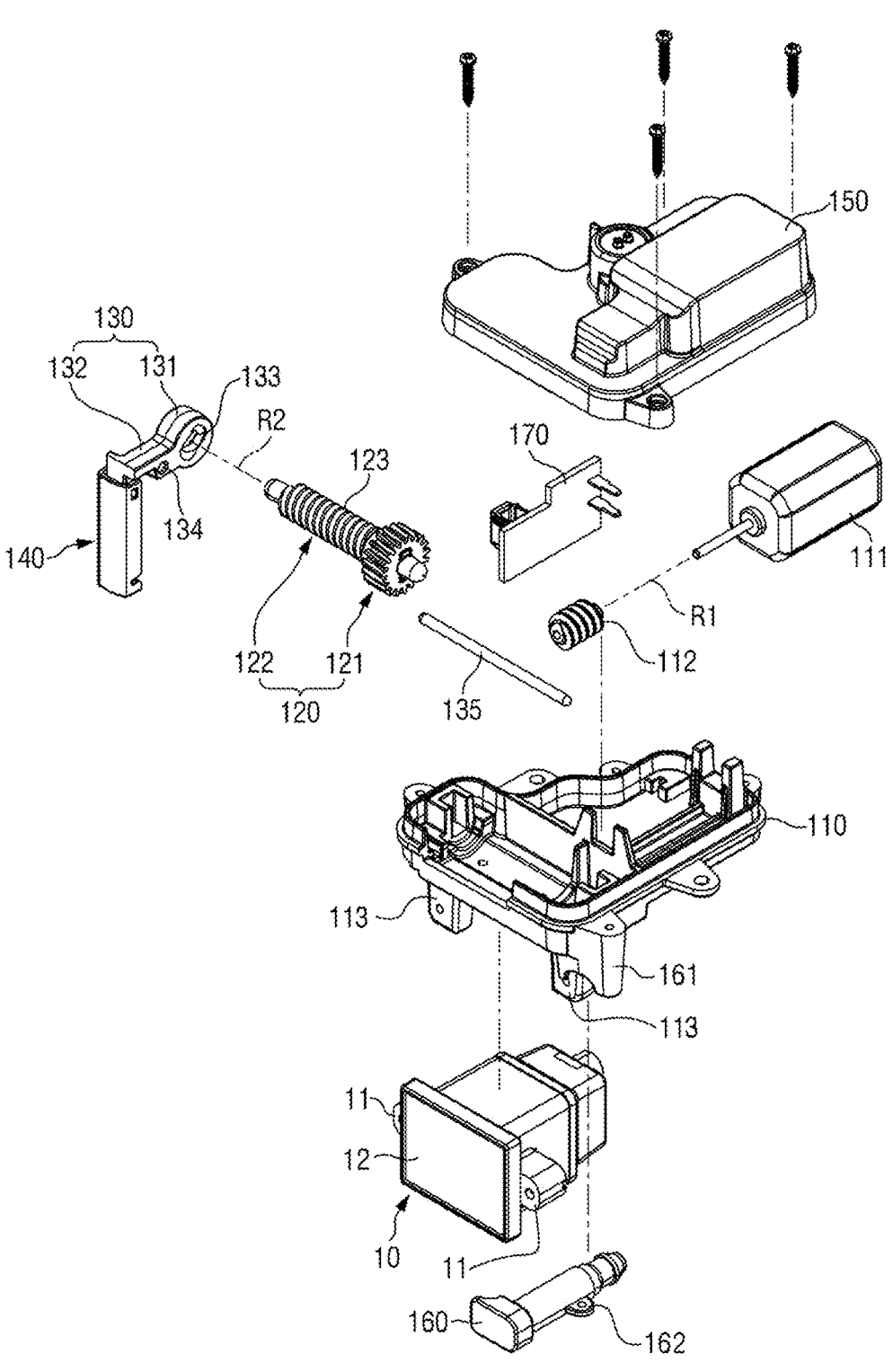
FIG. 2 is an exploded perspective view illustrating the wiping apparatus of FIG. 1.

FIG. 1 is a perspective view illustrating a wiping apparatus for a camera according to an embodiment of the present disclosure, and FIG. 2 is an exploded perspective view illustrating the wiping apparatus of FIG. 1.

Referring to FIGS. 1 and 2, a wiping apparatus 100 for a camera may include a housing 110, a rotation part 120, a conversion part 130, a cleaning part 140, a cover 150, a washer fluid injection module 160, and a control part 170.

First, the housing 110 may accommodate portions of a driving part 111, the rotation part 120, and the conversion part 130 therein, and may provide a single assembly structure as the cover 150 is coupled to the top thereof. The housing 110 and the cover 150 may be coupled to face each other, and the assembly positions of the driving part 111, the rotation part 120, and the conversion part 130 may be set inside the housing 110.

On the exterior of the housing 110, the cleaning part 140 may be disposed to be connected to the conversion part 130, and a camera module 10 and the washer fluid injection module 160 may be coupled.

The driving part 111, mounted inside the housing 110, may be provided as either a motor or an actuator. The driving part 111 will hereinafter be described as being implemented as, for example, a motor.

A worm gear 112 may be provided on the rotation axis of the driving part 111. Additionally, the rotation part 120 may include a worm wheel 121 and a screw shaft 122. The worm wheel 121 may be disposed to engage with the worm gear 112, and not be in parallel to the worm gear 112. The screw shaft 122 may be disposed to rotate on the same axis as the worm wheel 121, and not be in parallel to the worm gear 112. A first gear 123 may be formed on the outer periphery of the screw shaft 122. Therefore, the worm wheel 121 and the screw shaft 122 may be configured to rotate when the worm gear 112 rotates. The worm wheel 121 and the screw shaft 122 may be key-coupled.

Additionally, the conversion part 130 may engage with the rotation part 120 to convert a rotational motion into a linear reciprocating motion. The conversion part 130 may include a transfer member 131 and an extension member 132. The transfer member 131 may include a second gear 133 formed on an inner circumferential surface thereof, and the second gear 133 may be disposed to engage with the first gear 123. In other words, the screw shaft 122 may be inserted into the transfer member 131.

The extension member 132 may extend from the transfer member 131 to be at least partially exposed outside the housing 110. The extension member 132 may be integrally formed with the transfer member 131. The extension member 132 may include an aperture 134, which penetrates one side of the extension member 132. A guide member 135 may be inserted into the aperture 134. The guide member 135 may be disposed in parallel to the screw shaft 122 inside the housing 110 and may guide the linear reciprocating motion of the extension member 132. The guide member 135 may also function to prevent the transfer member 131 from rotating along with the screw shaft 122.

Moreover, the cleaning part 140 may extend from the conversion part 130 to the exterior of the housing 110 and may provide the function of wiping the surface of a protective cover 12, which is positioned in front of the lens of the camera module 10.

Here, the surface of the protective cover 12 may be the lens of a camera, or a separate transparent protective cover structure covering the outside of the lens. The surface of the protective cover 12 will hereinafter be described as being formed as, for example, a flat surface. Alternatively, the surface of the protective cover 12 may be formed as a curved surface with a predetermined curvature. In this embodiment, the cleaning part 140 will hereinafter be described as, for example, wiping the surface of a transparent protective cover 12 provided in front of the camera lens. The cleaning part 140 will be described later in further detail.

Additionally, the cover 150 may be coupled to the housing 110 to cover the top of the housing 110.

The washer fluid injection module 160 may be disposed adjacent to the surface of the protective cover 12, outside the housing 110. The washer fluid injection module 160 may provide the function of spraying water or cleaning fluid onto the surface of the protective cover 12 when the surface of the protective cover 12 becomes contaminated.

Furthermore, the control part 170 may control at least one of the driving part 111, the camera module 10, or the washer fluid injection module 160. The control part 170 will be described later in further detail.

Figure 3:
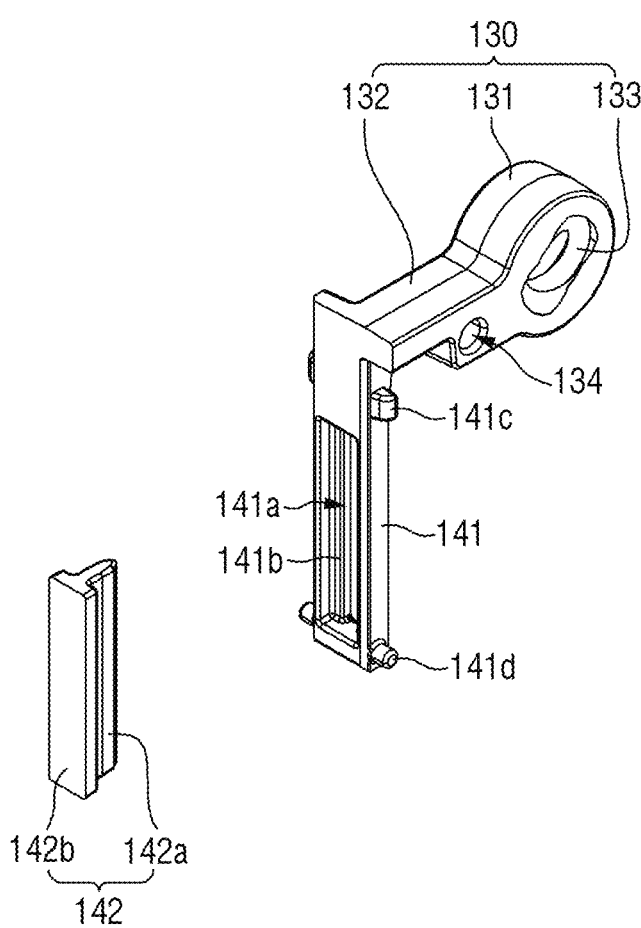
FIGS. 3 through 5 are schematic views illustrating an assembled state of the wiping apparatus of FIG. 1.
Figure 4:
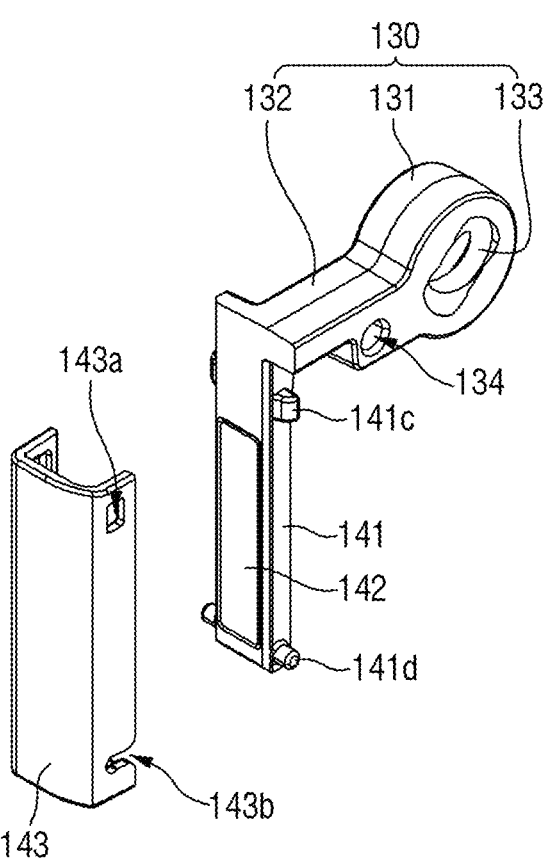
Figure 5:
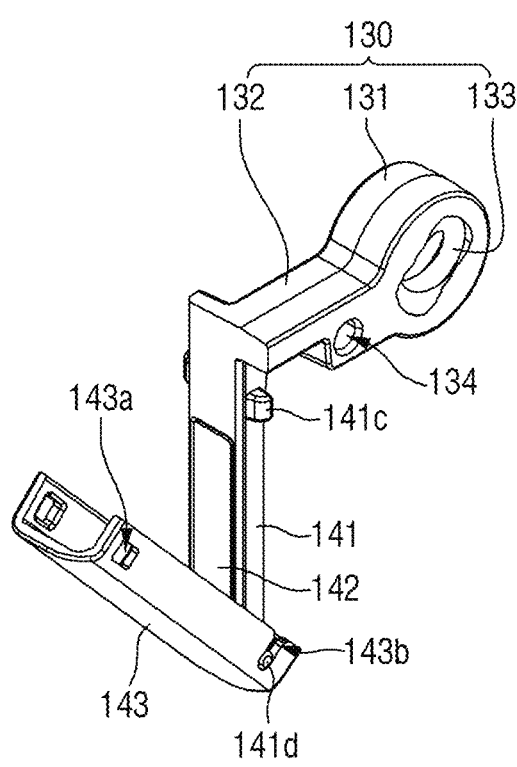

FIG. 3 is a perspective view illustrating the state where an arm member 141 and a blade 142 of the cleaning part 140 are detached, FIG. 4 is a perspective view illustrating the state where the blade 142 is coupled to the arm member 141 of the cleaning part 140 with a rotary cover 143 detached, and FIG. 5 is a perspective view illustrating the state where the rotary cover 143 is coupled on the arm member 141 of the cleaning part 140.

Referring to FIG. 3, the cleaning part 140 may include the arm member 141, the blade 142, and the rotary cover 143. The arm member 141 may be disposed to correspond to the surface of the protective cover 12, with a proximal end portion bent from the extension member 132. The arm member 141 may be formed to a length that corresponds to the height or width of the surface of the protective cover 12. The arm member 141 may include a mounting hole (e.g., slot) 141a and steps 141b.

The mounting hole 141a, through which the blade 142 is inserted into the arm member 141, may be formed to penetrate from the front to the rear of the arm member 141 facing the surface of the protective cover 12. The steps 141b may be provided on the inner rim of the mounting hole 141a to be interfered with along the mounting direction of the blade 142, thereby preventing the blade 142 from passing through the mounting hole 141a.

The blade 142 may include an elastic piece 142a and a mounting piece 142b. The elastic piece 142a may be disposed to elastically contact the surface of the protective cover 12 from the rear of the mounting hole 141a. The mounting piece 142b may be integrally formed with the elastic piece 142a and may be installed inside the mounting hole 141a, interfering with the steps 141b. In other words, the width of the mounting part 142b may be formed to be greater than the distance (e.g., gap) between the steps 141b.

Thus, when the blade 142 is coupled into the mounting hole 141a, the elastic piece 142a may be disposed to protrude through the mounting hole 141a to the rear of the arm member 141, contacting the surface of the protective cover 12, and the mounting piece 142b may be disposed inside the mounting hole 141a of the arm member 141.

The arm member 141 may include protrusion pieces 141c and support pieces 141d. The protrusion pieces 141c may be disposed to protrude on either side of the proximal end of the arm member 141. The protrusion pieces 141c may be arranged to interfere or engage with the rotary cover 143 when the rotary cover 143 is fully coupled. The support pieces 141d may be disposed to protrude on either or both sides of the distal end of the arm member 141. The support pieces 141d may enable the rotation of the rotary cover 143 by forming the rotation axis for the rotary cover 143.

The rotary cover 143 may be disposed to cover the front of the arm member 141. The rotary cover 143 may include first coupling holes 143a, which are formed on either side of the proximal end of the rotary cover 143, and second coupling holes 143b, which are formed on either or both sides of the distal end of the rotary cover 143. The first coupling holes 143a may be disposed to interfere with the protrusion pieces 141c of the arm member 141, and the second coupling holes 143b may be disposed to be coupled with the support pieces 141d of the arm member 141.

As described earlier, the blade 142 may be detachably coupled to the mounting hole 141a. The blade 142, which is a type of consumable, may be detached and disposed of when its cleaning efficiency is decreased during the cleaning of the surface of the protective cover 12, and a new blade 142 may be mounted.

FIG. 4 illustrates the state where the blade 142 is coupled on the arm member 141 with the rotary cover 143 assembled. Referring to FIG. 5, when the support pieces 141d are coupled with the second coupling holes 143b of the rotary cover 143, the rotary cover 143 may be configured to be rotatable with respect to the arm member 141. Then, upon the protrusion pieces 141c being inserted into the first coupling holes 143a at the proximal end of the rotary cover 143, the coupling of the rotary cover 143 may be completed.

The process of detaching and disposing of the blade 142 may be performed in the reverse order of the assembly of the rotary cover 143.

Therefore, as the rotary cover 143 is configured to be rotatable around the support pieces 141d as its rotation axis, the rotary cover 143 may prevent the blade 142 from being disengaged from the arm member 141 and also may allow the front of the mounting hole 141a of the arm member 141 to be opened for detachment and disposal for maintenance.

For example, when the rotary cover 143 is disposed to be in close contact with the arm member 141, the rotary cover 143 may not only protect the blade 142 from being disengaged from the arm member 141 but also support the blade 142 to be in close contact with the surface of the protective cover 12. Moreover, when the rotary cover 143 rotates around the support pieces 141d of the arm member 141 as its rotation axis, it may become easier to detach and dispose of the blade 142 at the time of replacement, simplifying maintenance. Additionally, since the rotary cover 143 is arranged to cover the exterior of the blade 142, the rotary cover 143 may more effectively prevent contamination of the blade 142.

Figure 6:
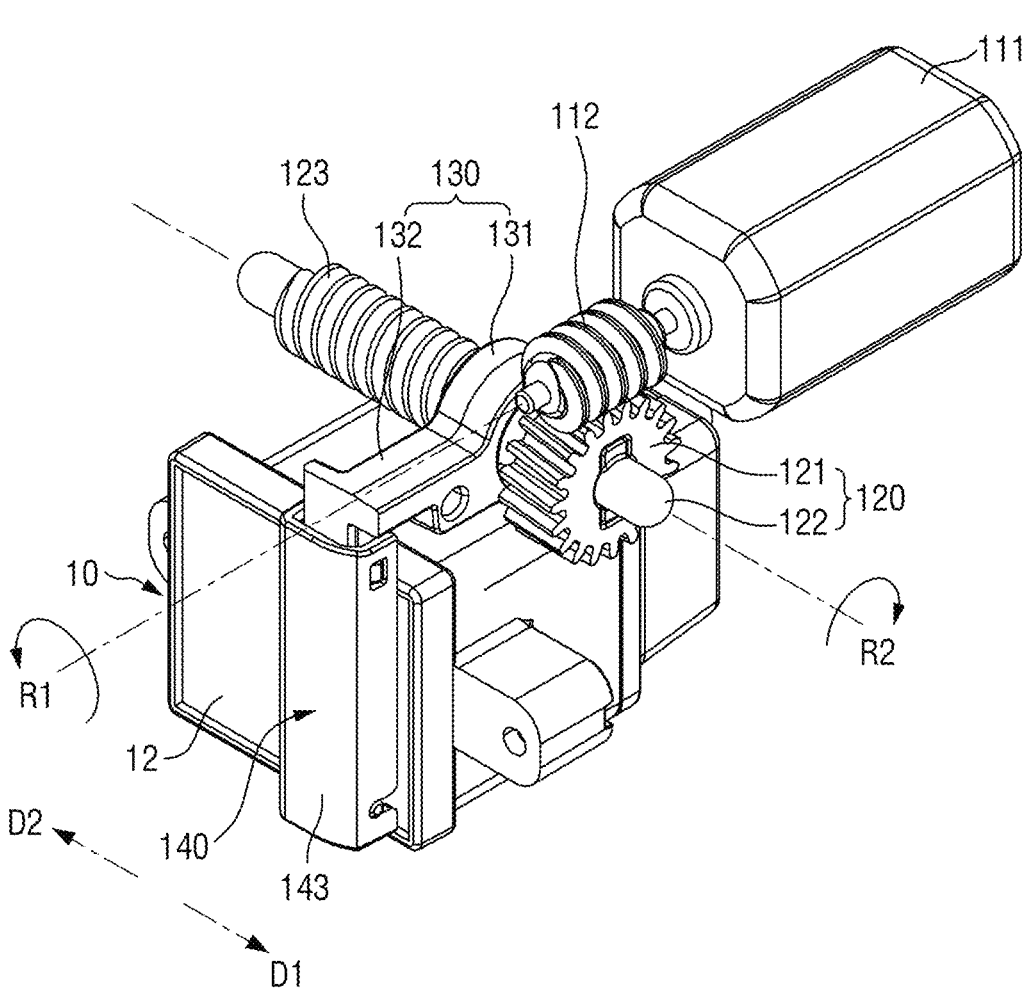
FIGS. 6 and 7 are perspective views illustrating operating states of a conversion part, a conversion part, and a cleaning part of the wiping apparatus of FIG. 1.
Figure 7:
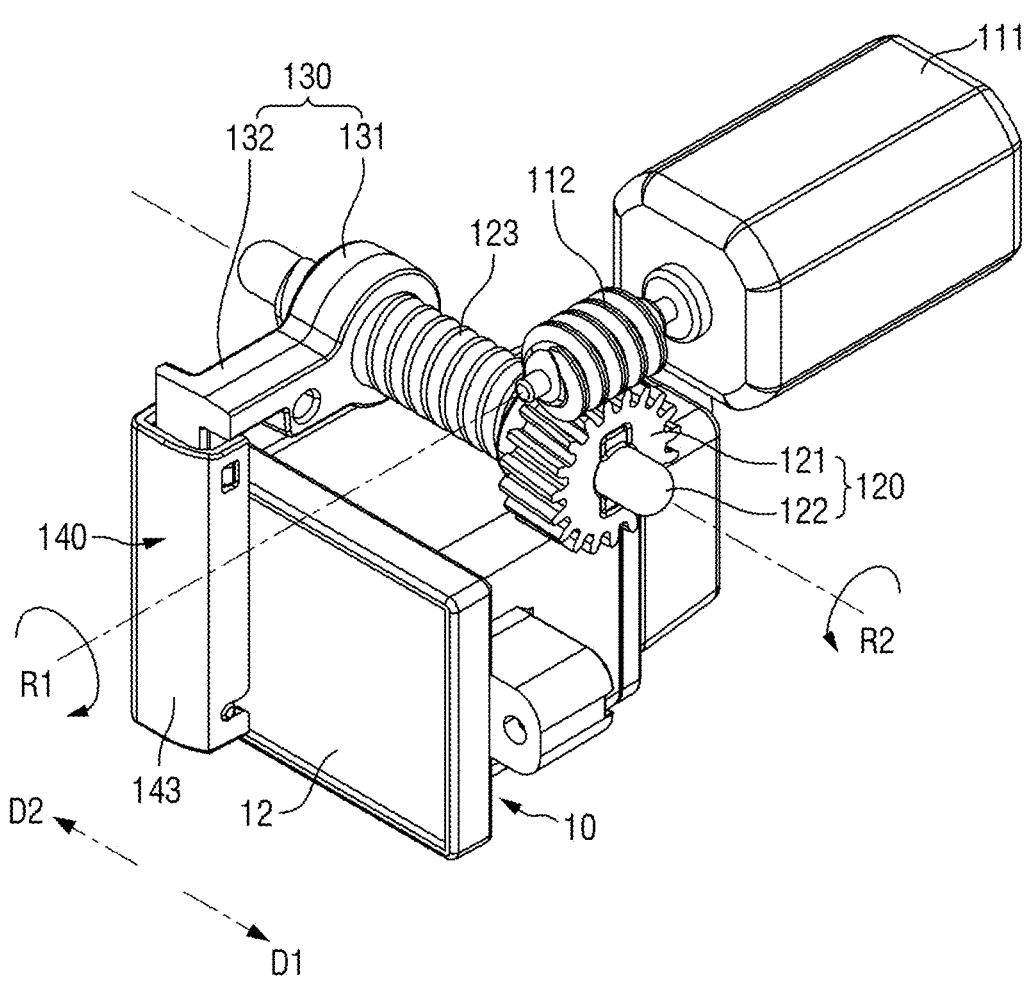

FIG. 6 is a perspective view illustrating the state where the conversion part 130 is at a base position on the rotation part 120, and FIG. 7 is a perspective view illustrating the state where the conversion part 130 of FIG. 6 has moved on the rotation part 120 and performed a first cleaning process for the surface of the protective cover 12.

In FIG. 6, the conversion part 130 and the cleaning part 140 are disposed in a base position, which is an initial driving position. Here, the base position of the conversion part 130 and the cleaning part 140 may be where the movement of the conversion part 130 in a first direction D1 toward the worm wheel 121 on the screw shaft 122 is limited, and the conversion part 130 is movable in a second direction D2, which is opposite to the first direction D1. In other words, the base position may be where the first cleaning process by the conversion part 130 begins. The process of setting the initial position for the conversion part 130 to be in the base position will be described later along with the description of the control part 170.

In the state depicted in FIG. 6, when power is supplied to the driving part 111, the conversion part 130 and the cleaning part 140 move linearly in the second direction D2 from one side to the other side of the surface of the protective cover 12, as illustrated in FIG. 7. At this time, the first cleaning process for the surface of the protective cover 12 may be performed.

The conversion part 130 may be moved along the guide member 135 that passes through the aperture 134 formed in the extension member 132.

In the state depicted in FIG. 7, as the conversion part 130 and the cleaning part 140 move linearly again in the first direction D1, a second cleaning process for the surface of the protective cover 12 may be performed, and the conversion part 130 and the cleaning part 140 may return to the base position.

Specifically, when power is supplied to the driving part 111, the worm gear 112 may be rotated. For example, if the worm gear 112 rotates clockwise around a first rotation axis R1, the worm wheel 121 may rotate counterclockwise around a second rotation axis R2 of the screw shaft 122. Consequently, the screw shaft 122 may also rotate counterclockwise, causing the conversion part 130 to move in the second direction D2 and enabling the first cleaning process by the cleaning part 140. Conversely, if the worm gear 112 rotates counterclockwise around the first rotation axis R1, the worm wheel 121 may rotate clockwise around the second rotation axis R2, and simultaneously, the screw shaft 122 may also rotate clockwise, causing the conversion part 130 to move in the first direction D1 and enabling the second cleaning process by the cleaning part 140. Moreover, if the conversion part 130 contacts the worm wheel 121 directly or contacts a stopper provided adjacent to the worm wheel 121 that limits the movement of the conversion part 130 in the first direction D1, the conversion part 130 may stop again in the base position. The stopper may be disposed adjacent to the worm wheel 121 on the screw shaft 122 or inside the housing 110 to interfere with the movement of the conversion part 130 in the first direction D1.

The operation of the driving part 111 may be manually initiated by being switched on by a user or may be automatically activated when the camera module 10 or a separate sensor detects foreign substances or water droplets on the surface of the protective cover 12, allowing the cleaning part 140 to operate automatically.

Figure 8:
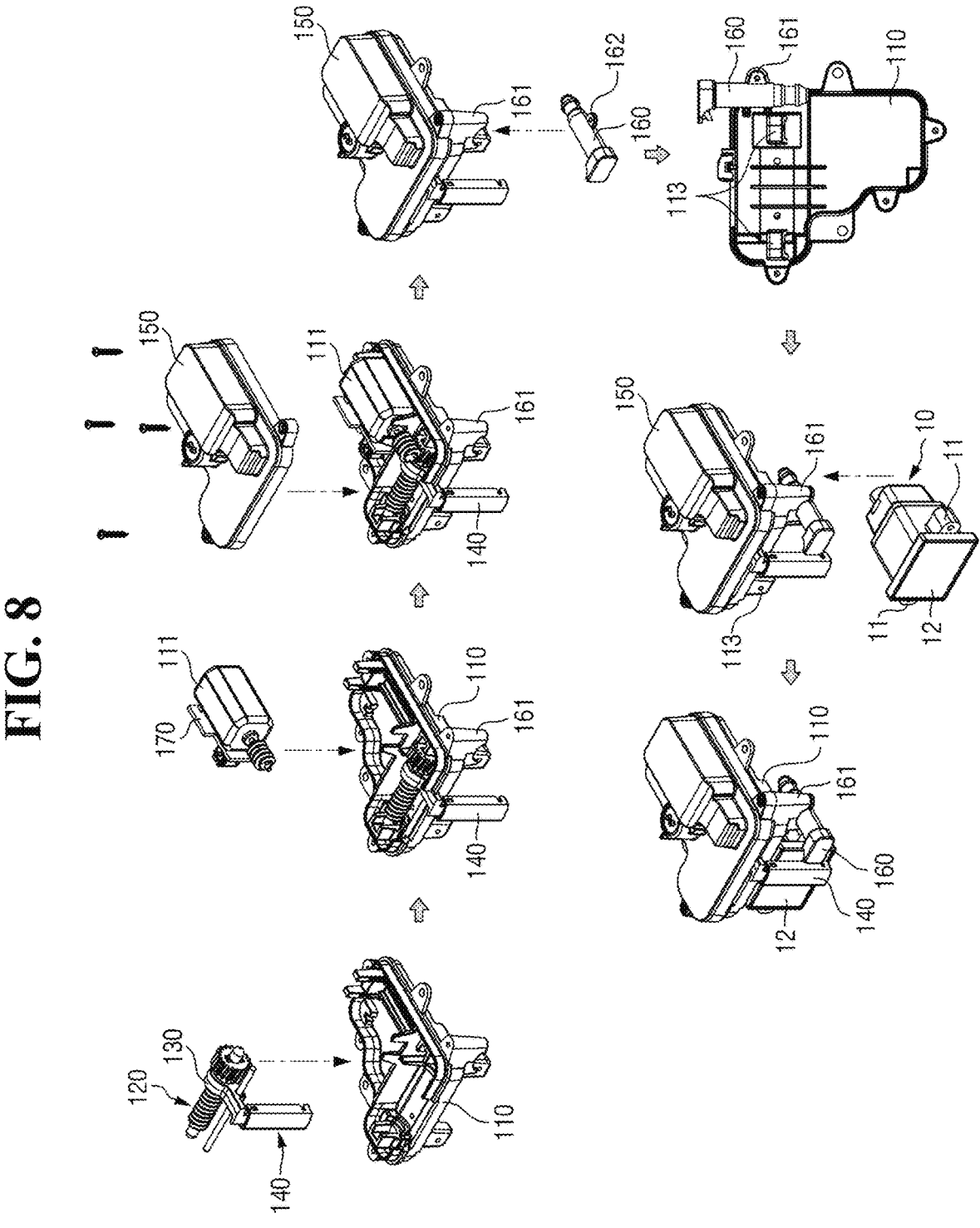
FIG. 8 is a schematic view illustrating the process of assembling the wiping apparatus of FIG. 1.

FIG. 8 is a schematic diagram illustrating the process of assembling the wiping apparatus according to the present disclosure. Referring to FIG. 8, the wiping apparatus 100 may be assembled by assembling the conversion part 130 and the cleaning part 140 first and then mounting the assembly of the conversion part 130 and the cleaning part 140 inside the housing 110. The cleaning part 140 may also be mounted to be exposed outside the housing 110.

Once the conversion part 130 and the cleaning part 140 are mounted in the housing 110, the driving part 111 may be mounted, and the cover 150 may be coupled on top of the housing 110 to cover the driving part 111, the rotation part 120, and the conversion part 130.

Then, the washer fluid injection module 160 may be coupled to the bottom of the housing 110. A first fastening member 161 may be provided at the bottom of the housing 110, and the washer fluid injection module 160 may be provided with a second fastening member 162, which is coupled to the first fastening member 161. The first and second fastening members 161 and 162 may be screwed together by a fastener.

Finally, the assembly of the wiping apparatus 100 may be completed when the camera module 10 is coupled to correspond to the cleaning part 140 at the bottom of the housing 110. A pair of coupling members 113, which protrude downwardly side by side, may be provided at the bottom of the housing 110. The camera module 10 may be provided with fixing members 11, which protrude on either or both sides of the camera module 10, allowing the camera module 10 to be coupled through fasteners on the coupling members 113. Therefore, the camera module 10 may be assembled at the bottom of the housing 110 via the fixing members 11 and the coupling members 113.

The coupling of the washer fluid injection module 160 and the camera module 10 on the housing 110 may be achieved not only by screw coupling using a fastener, but also by providing a ring-shaped or box-shaped mounting area at the bottom of the housing 110 and inserting the washer fluid injection module 160 and the camera module 10 into the mounting area in a one-touch manner.

Thus, as the conversion part 130, the cleaning part 140, and the driving part 111 are mounted on top of the housing 110 together with the cover 150 and the camera module 10 and the washer fluid injection module 160 are mounted at the bottom of the housing 110, allowing for unit modularization, the wiping apparatus 100 can significantly reduce the number of assembly parts and thereby increase assembly efficiency.

Figure 9:
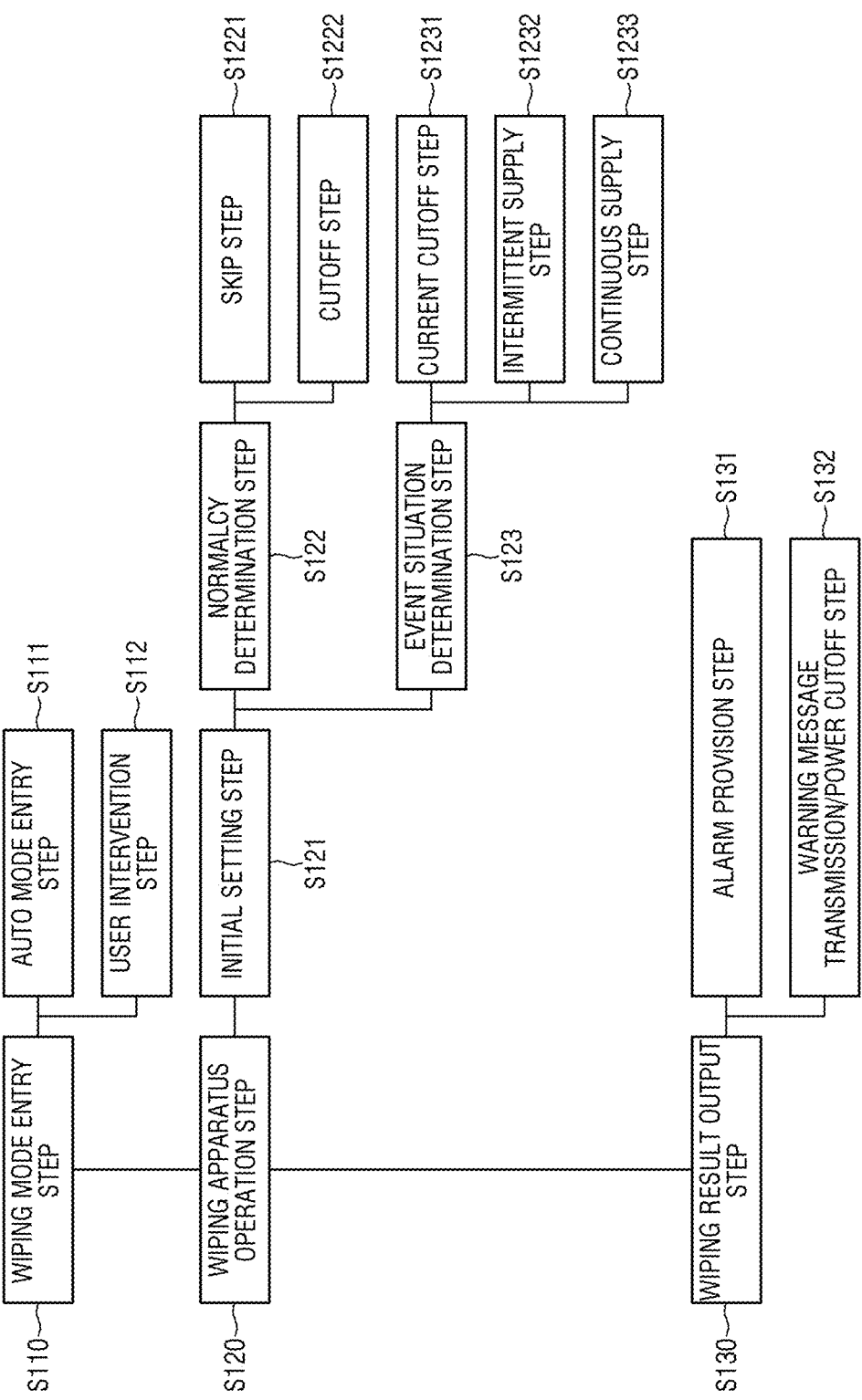
FIG. 9 is a block diagram illustrating a control method for a wiping apparatus for a camera, according to an embodiment of the present disclosure.

FIG. 9 is a block diagram illustrating a control method for a wiping apparatus for a camera, according to an embodiment of the present disclosure. Referring to FIG. 9, the control method may include a wiping mode entry step (S110), a wiping apparatus operation step (S120), and a wiping result output step (S130).

First, the wiping mode entry step (S110) may include an auto mode entry step (S111) and a user intervention step (S112).

The wiping mode entry step (S110) may allow the selection of the start of operation of the wiping apparatus. For example, the operation of the wiping apparatus may automatically start by the auto mode entry step (S111) when a vehicle is started or when the driving power is supplied, or the wiping apparatus operation step (S120) may proceed before the operation of the wiping apparatus.

That is, the auto mode entry step (S111) may automatically initiate the operation of the wiping apparatus simultaneously with the vehicle's ignition or when the driving power is supplied (i.e., in "ACC" or "ON" mode) before the driving starts. If it is determined that the operation of the wiping apparatus is not necessary during the auto mode entry step (S111), the operation of the wiping apparatus may be controlled by the vehicle's control part (e.g., a controller) not to be executed.

Furthermore, the user intervention step (S112) of the wiping mode entry step (S110) may be performed while the auto mode entry step (S111) is activated, or the operation of the wiping apparatus may be performed based on the user's judgment, regardless of whether the auto mode has been activated. For example, the user may operate the wiping apparatus before or after starting the vehicle for the purpose of removing foreign substances adhered to the protective cover or camera module of the wiping apparatus.

Moreover, the wiping apparatus operation step (S120) may include an initial position setting step (S121). Here, the wiping apparatus refers to the aforementioned wiping apparatus for a camera.

The initial position setting step (S121) may, as previously mentioned, determine whether the conversion part or the cleaning part of the wiping apparatus is in the base position, which is the initial driving position. If it is determined that the conversion part or the cleaning part is in the base position, the wiping apparatus may be operated normally, and if it is determined that the conversion part or the cleaning part is not in the base position, the position of the conversion part or the cleaning part may be calibrated.

Here, the base position may be a part where the initial operation of the cleaning part begins at either the left or right end of the protective cover of the camera module. The initial position setting step (S121) may be performed selectively by user intervention or automatically whenever the wiping mode entry step (S110) is executed, without user intervention.

The initial position setting step (S121) may include a normalcy determination step (S122) and an event situation determination step (S123). The normalcy determination step (S122), where the conversion part or cleaning part is disposed in the base position, may include a skip step (S1221) and a cutoff step (S1222). The skip step (S1221) may be a step where a current measurement is skipped within a predetermined first time range set during the initial operation of the driving part. The cutoff step (S1222) may be a step where the supply of restraining current is cut off after the first time range. The conditions for the current and the time required for the skip step (S1221) and the cutoff step (S1222) will be described later with reference to FIG. 10.

The event situation determination step (S123) may include a current cutoff step (S1231), an intermittent supply step (S1232), and a continuous supply step (S1233).

First, the current cutoff step (S1231) may be a step where abnormal power is cut off if an overvoltage above a predetermined driving voltage is applied. For example, current may be cut off to protect the wiping apparatus when a surge voltage such as a power outage or static electricity occurs.

The intermittent supply step (S1232) may be a step where power is intermittently supplied for a predetermined third time range if the movement of the conversion part is restricted. For example, by repeating the process of applying power for the third time range and then cutting it off, the movement of the conversion part may be controlled to become smooth.

The continuous supply step (S1233) may be a step where power is continuously supplied for a predetermined fourth time range if the movement of the conversion part is restricted. The fourth time range may be longer than the third time range.

The event situation determination step (S123) may control one or more of the current cutoff step (S1231), the intermittent supply step (S1232), and the continuous supply step (S1233) to be sequentially performed, or may control the sequential performing of one or more of the cutoff step (S1231), the intermittent supply step (S1232), and the continuous supply step (S1233) to be repeated three to five times and then determine whether the wiping apparatus is in a normal or abnormal operating state. If the wiping apparatus is in a normal operating state, the initial position setting step (S121) may be repeated until the conversion part or the cleaning part is disposed at the base position.

Thus, by performing the event situation determination step (S123) by the control part, the fail-safe feature for the wiping apparatus can be implemented. Additionally, factors hindering the operation of the wiping apparatus can be entirely eliminated or substantially alleviated, thereby facilitating smoother operation of the wiping apparatus.

The wiping result output step (S130) may be a step for determining whether the operation of the wiping apparatus has been completed normally or abnormally and allowing the user to identify the result of the determination through an output unit. The wiping result output step (S130) may include an alarm provision step (S131) and a warning message transmission/power cutoff step (S132).

Specifically, the alarm provision step (S131), which corresponds to a case where the operation of the wiping apparatus has been completed normally, may alert the user through an alarm that the operation of the wiping apparatus has been completed normally after the setting of the initial position through the wiping apparatus operation step (S120).

The warning message transmission/power cutoff step (S132), which corresponds to a case where the operation of the wiping apparatus has been completed abnormally, may send a warning message indicating that the event situation determination step (S123) is not completed or the operation of the camera wiping apparatus has not been executed or has been terminated incompletely, and may then cut off power. Alternatively, the order of sending the warning message and cutting off the power may be reversed.

The alarm provision step (S131) and the transmission of the warning message may be performed through the vehicle's display or speaker or through a mobile device associated with the vehicle's user so that the alarm and the warning message may be output visually or auditorily.

Figure 10:
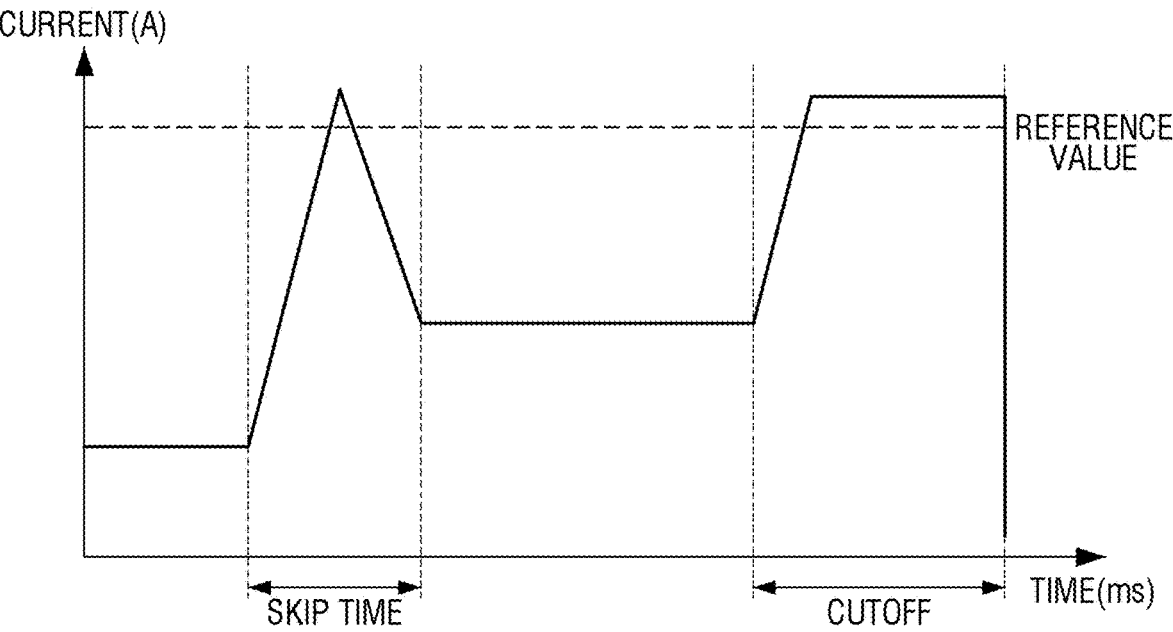
FIG. 10 is a graph illustrating the relationship between current and time during the initial position setting step of FIG. 9.

FIG. 10 is a graph illustrating the relationship between current and time during the initial position setting step of FIG. 9. As previously mentioned, the skip step (S111) may be a step where the current measurement within the first time range, set in the initial operation of the driving part, is skipped.

For example, when the conversion part starts its linear motion and power is supplied to the driving part, an inrush current may be generated, exceeding the driving current range of the driving part beyond a reference value. In this case, the skip step (S111) may be performed to prevent the control part from misinterpreting the inrush current as power input error.

In the initial position setting step (S110), the skip step (S111) may prevent the supply of current from being cut off, if the amount of supplied current exceeds a reference value (or a predetermined threshold value for current) but the supply of current is not continued for longer than a predetermined skip time range (or exceeds a predetermined threshold value for time). The reference value for current may range between about 0.25 A and about 1 A, and may preferably be set at 0.7 A. The skip time range may be set to be about 0.3 seconds or longer.

Not only in the initial position setting stage (S110) but also during the general operation process, power cutoffs can be prevented if the threshold values for current and time are not simultaneously met.

The initial position setting step (S110) involves applying power to the driving part to move the conversion part in the first direction D1, and if there is no movement of the conversion part or if the conversion part contacts the worm wheel or the stopper, the control part may determine that the setting of the base position is complete. Here, if power is supplied to the driving part to move the conversion part in the first direction D1 and the conversion part or cleaning part is not in the base position, the base position may be achieved by moving the conversion part until it does not move any further in the first direction D1.

Once the first time range set in the skip step (S111) has passed, the current may be measured from the control part or a precision resistor provided in the control part. Then, if the driving current range is not met, power may be cut off.

The cutoff step (S1222) may be a step where the supply of restraining current is cut off after the first time range. Preferably, after instructions for the cutoff step (S1222), the control part may control the power to be immediately cut off. Alternatively, after the instructions for the cutoff step (S1222), the control part may adjust a second time range such that the power may be cut off after the second time range.

In FIG. 10, the cutoff step (S1222) is a step where power is cut off after the lapse of the second time range, and the cutoff step (S1222) may control the second time range to be minimized. Furthermore, in the initial position setting step (S110), the driving part may be controlled by the control part to perform at least once the process of moving the conversion part in the first direction D1 and then in the second direction D2.

Figure 11:
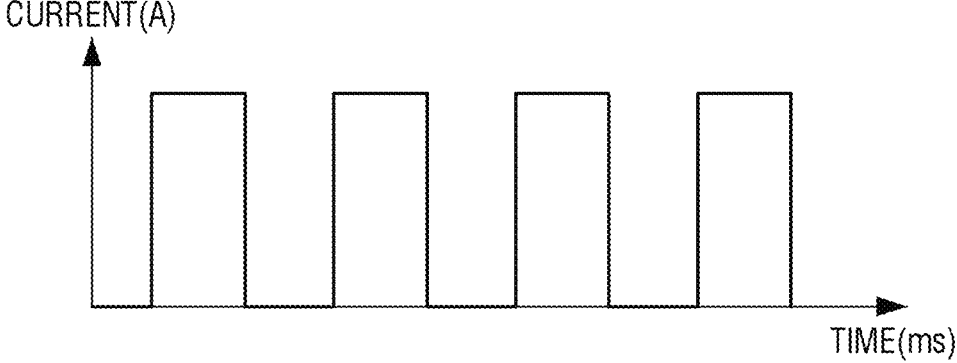
FIGS. 11 and 12 are graphs illustrating the relationship between current and time in the event situation determination step of FIG. 9.
Figure 11:
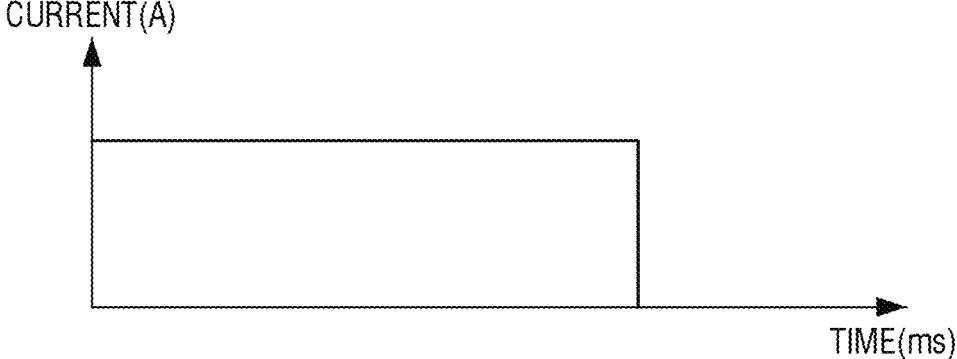
Figure 12:
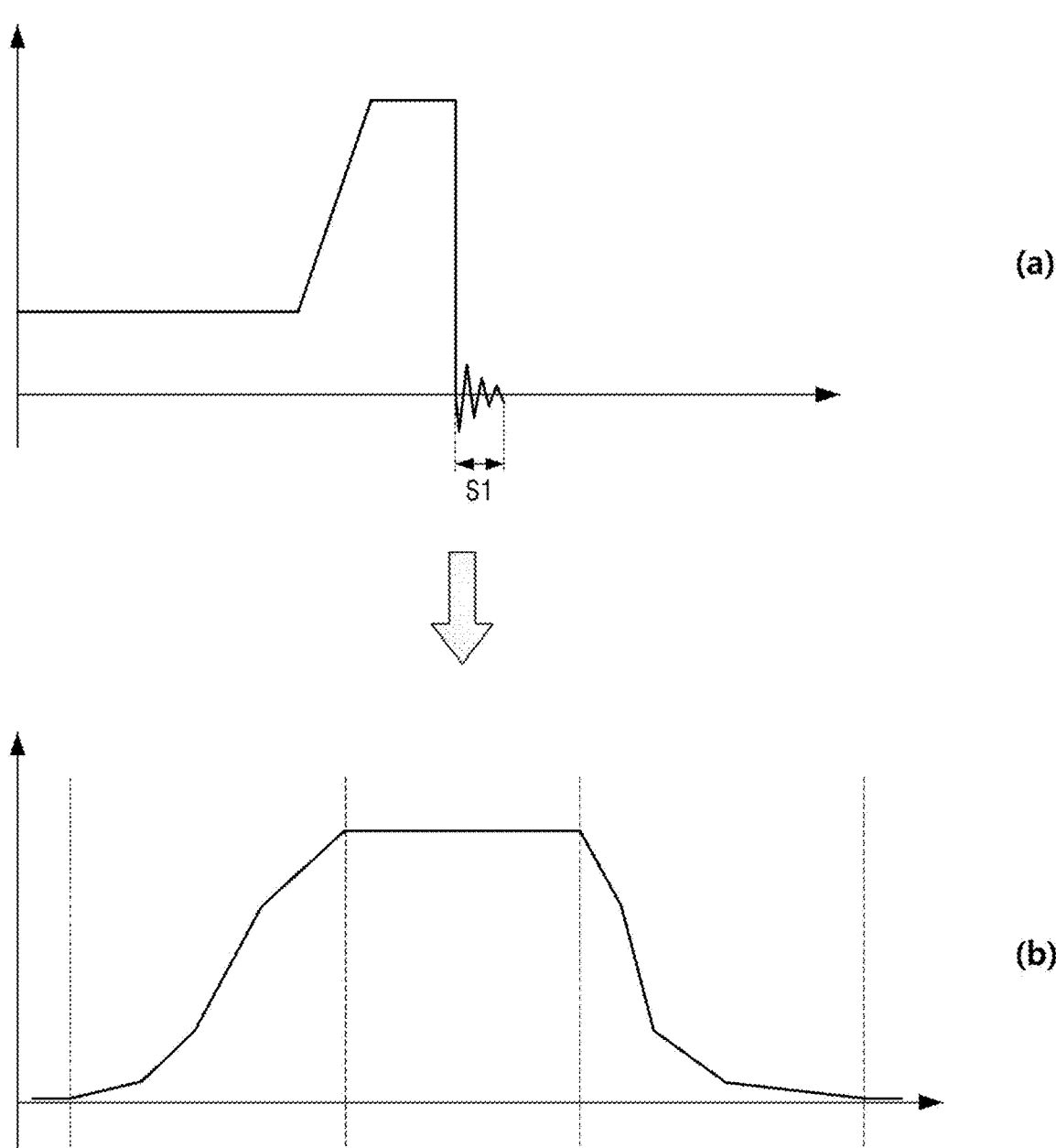

FIGS. 11 and 12 are graphs illustrating the relationship between current and time in the event situation determination step of FIG. 9. The upper panel of FIG. 11 illustrates the intermittent supply step (S1232) where the same amount of current is supplied intermittently multiple times over the third time range. That is, if the cleaning part is unable to move due to foreign substances or ice formed on the surface of the protective cover, the intermittent supply of current may cause the foreign substances to fall off or the ice to melt, allowing the cleaning part to be movable along with the conversion part. The lower panel of FIG. 11 illustrates the continuous power supply step (S1233), where a predetermined amount of current is supplied over the fourth time range.

Similarly, if the cleaning part is unable to move due to foreign substances or ice on the surface of the protective cover, the continuous supply of current may cause the foreign substances to fall off or the ice to melt, allowing the cleaning part to be movable along with the conversion part.

The control part may perform both the intermittent supply step (S1232) and the continuous supply step (S1233) simultaneously, and the order of the intermittent supply step (S1232) and the continuous supply step (S1233) is not particularly limited.

The top panel of FIG. 12 is a graph illustrating how back noise is generated by a sudden power cutoff in a conventional driving part. Due to the characteristics of a motor, when the motor stops, counter-rotation may occur due to a back electromotive force, and as a result, back noise may be generated. However, back noise may be perceived as a defect or may cause stress to the user. Referring to the bottom panel of FIG. 12, to prevent the back noise, the control part may be configured to control the voltage applied to the driving part to decrease gradually over time at the time of power cutoff. For example, the voltage applied to the driving part may be 10 V at the time of power cutoff, 7 V after a predetermined unit time of N seconds, 5 V after 2N seconds, and 4 V after 3N seconds, so that power is gradually cut off while gradually reducing the rate of voltage reduction. By gradually cutting off the power, the generation of a back electromotive force can be prevented or reduced, and consequently, the occurrence of back noise in the driving part can be prevented or reduced.

FIG. 13 is a block diagram illustrating a wiping apparatus for a camera according to another embodiment of the present disclosure. Referring to FIG. 13, a wiping apparatus 200 may include a camera module 10, an operating unit 210, an input unit 220, a control unit 170, and an output unit 20.

A control method using the camera module 10 and the control unit 170 is as described earlier, and thus, a detailed description thereof will be omitted. The operating unit 210 may include a driving part 111, a rotation part 120, a conversion part 130, and a cleaning part 140. The driving part 111, the rotation part 120, the conversion part 130, and the cleaning part 140 are substantially the same as their respective counterparts of the wiping apparatus 100, and detailed descriptions thereof will also be omitted.

The input unit 220 may provide the function of selecting between a user intervention mode and an auto mode and may be implemented as a switch structure provided within a vehicle. The input unit 220 may be disposed in the same position as or in a similar area to the switch structure that operates the front or rear windshield wipers of the vehicle.

As described earlier, the output unit 20 may have the function of providing an alarm to a user or receiving and displaying a warning message to allow the user to identify the warning message, and may be implemented as the vehicle's display or speaker or as a mobile device associated with the user.

Therefore, according to embodiments of the present disclosure, a wiping apparatus for a camera that wipes the surface of a protective cover in front of the lens of a camera module can be configured as a single module, and consequently, workability and compatibility can be improved. Also, the wiping apparatus can wipe the entire surface of the protective cover, allowing for the employment of a camera with a relatively wider angle compared to a conventional camera. Also, as a blade is disposed on the inside of a rotary cover, the detachment of the blade can be facilitated using the rotary cover. Further, as a conversion part, a cleaning part, and a driving part are mounted on a housing, and at the same time, a camera module and a washer fluid injection module are installed below the housing, unit modularization is enabled, thereby significantly reducing the number of assembly parts.

Furthermore, according to embodiment of the present disclosure, the wiping apparatus can be controlled through initial position setting to wipe the entire surface of the protective cover in front of the lens of the camera module. Also, by adjusting power supply and cutoff times and intervals in an event situation determination step of a control method for the wiping apparatus, the conversion part and the cleaning part can be sequentially restored to an operable state even in cases of inoperability due to foreign substances or freezing conditions. Also, back noise that may be formed due to the characteristics of a motor can be eliminated by controlling the rate of reduction in the magnitude of voltage applied to the driving part over time to gradually decrease. Also, a fail-safe feature can be secured for the driving part when there is malfunction in the operation of the cleaning part and the conversion part, and through a wiping result output step of the control method, a user can more easily identify whether the wiping apparatus is in a normal or abnormal operating state.

While specific embodiments have been illustrated and described to exemplify the technical idea of the present disclosure, the present disclosure is not limited to the specific embodiments and operations described above, and various modifications can be made without departing from the scope of the present disclosure. Therefore, such modifications should also be considered within the scope of the present disclosure, and the scope of the present disclosure should be determined by the claims that follow.

What is claimed is:

1. A wiping apparatus for a camera, comprising:
a housing in which a driving part is configured to be mounted;
a rotation part that rotates by being engaged with a worm gear, which is coupled to a first rotation axis of the driving part;
a conversion part that is engaged with the rotation part and configured to move in a linear reciprocating motion along a length direction of the rotation part within the housing in response to a rotational motion of the rotation part; and
a cleaning part that extends from the conversion part to an outside of the housing, wherein the cleaning part wipes a surface of a protective cover, which is provided in front of a lens of a camera module.

2. The wiping apparatus of claim 1, wherein the rotation part comprises:
a worm wheel, which rotates about a second rotation axis that is not parallel to the first rotation axis of the worm gear; and
a screw shaft, which includes the worm wheel disposed at a proximal end portion thereof and includes a first gear formed on an outer circumferential surface thereof where the worm wheel is not disposed.

3. The wiping apparatus of claim 2, wherein the conversion part comprises:
a transfer member, which includes a second gear formed on an inner circumferential surface thereof to engage with the first gear; and an extension member, which extends from the transfer member to be at least partially exposed on the outside of the housing.

4. The wiping apparatus of claim 3, wherein the cleaning part comprises:

an arm member, which has a proximal end bent at a distal end of the extension member to correspond to the protective cover and has a length corresponding to a height or width of the protective cover;

a blade, which is detachably mounted in the arm member by being inserted from a front of the arm member and protrudes at least partially to a rear of the arm member facing the surface of the protective cover; and a rotary cover, which is rotatably coupled to the arm member to cover the front of the arm member.

5. The wiping apparatus of claim 4, wherein the arm member comprises:

a mounting hole, which is formed to allow the blade to be inserted thereinto; and steps, which are configured to be interfered with the blade in a direction of coupling of the blade to prevent the blade from passing through the mounting hole.

6. The wiping apparatus of claim 5, wherein the blade comprises:

an elastic piece, which is configured to elastically contact the surface of the protective cover when inserted into the mounting hole; and a mounting piece, which is integrally formed with the elastic piece and is installed inside the mounting hole by abutting the steps.

7. The wiping apparatus of claim 5, wherein the arm member further comprises:

protrusion pieces, which protrude from either side of a proximal end of the arm member and selectively interfere with first coupling holes formed on either side of a proximal end of the rotary cover; and support pieces, which protrude from either side of a distal end of the arm member and form a rotation axis by being inserted into second coupling holes formed on either side of a distal end of the rotary cover.

8. The wiping apparatus of claim 3, wherein the extension member comprises an aperture formed on one side thereof adjacent to the transfer member, and wherein the conversion part includes a guide member, which is disposed parallel to the screw shaft inside the housing and guides the linear reciprocating motion of the extension member.

9. The wiping apparatus of claim 1, further comprising:

a cover coupled on the housing to cover the rotation part, a transfer part of the conversion part, and the driving part; and a washer fluid injection module coupled to the outside of the housing, which is configured to spray cleaning fluid toward the surface of the protective cover.

\* \* \* \* \*